(12) United States Patent
Lin

(10) Patent No.: US 8,253,777 B2
(45) Date of Patent: Aug. 28, 2012

(54) PANORAMIC CAMERA WITH A PLURALITY OF CAMERA MODULES

(75) Inventor: Tsung-Yu Lin, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 511 days.

(21) Appl. No.: 12/609,148

(22) Filed: Oct. 30, 2009

(65) Prior Publication Data

US 2010/0245539 A1 Sep. 30, 2010

(30) Foreign Application Priority Data

Mar. 30, 2009 (CN) .......................... 2009 1 0301200

(51) Int. Cl.
*H04N 7/00* (2006.01)

(52) U.S. Cl. ...................................................... 348/36

(58) Field of Classification Search ............... 348/36–39
See application file for complete search history.

(56) References Cited

U.S. PATENT DOCUMENTS

| | | | | |
|---|---|---|---|---|
| 6,738,073 B2 * | 5/2004 | Park et al. ...................... 345/629 |
| 7,129,460 B1 * | 10/2006 | Olson et al. ................. 250/208.1 |
| 7,424,218 B2 * | 9/2008 | Baudisch et al. .............. 396/322 |
| 2004/0263611 A1 * | 12/2004 | Cutler .............................. 348/36 |
| 2006/0023106 A1 * | 2/2006 | Yee et al. ....................... 348/335 |
| 2009/0201361 A1 * | 8/2009 | Lyon et al. ....................... 348/36 |
| 2010/0045773 A1 * | 2/2010 | Ritchey ........................... 348/36 |

* cited by examiner

*Primary Examiner* — Brendan Higa
(74) *Attorney, Agent, or Firm* — Altis Law Group, Inc.

(57) ABSTRACT

An exemplary panoramic camera includes a housing, camera modules received in the housing, viewfinders, and an image processor. Each camera module includes a lens, a reflective mirror, and an image sensor in an order written from an object side to an image side. The camera modules cooperatively form a 360 degrees view image of the surrounding scene. An angle is defined between the plane of the reflective mirror and a light sensing surface of the image sensor. Each reflective mirror is rotatable between a first position where the angle is an acute angle, light is reflected by the reflective mirror to the corresponding viewfinder, and a second position where the angle is about 90 degrees, light is incident upon the light sensing surface of the image sensor. The image processor stitches together the images captured by the camera modules into a single panoramic image of the surrounding scene.

16 Claims, 5 Drawing Sheets

PANORAMIC CAMERA WITH A PLURALITY OF CAMERA MODULES

BACKGROUND

1. Technical Field

The present disclosure relates to optical imaging and, particularly, to a panoramic camera with a plurality of camera modules to obtain a wide view picture.

2. Description of Related Art

A typical camera module usually has a view angle of about 50 degrees. A shooting angle mainly depends on the view angle of the camera module. Thus it cannot be applied to shoot wide view of landscapes or scenes of collective commemorative photo.

Recently, a wide view camera is employed to shoot the wide view picture. A typical view angle of the wide view camera is about 90 degrees. A view angle of fish-eye camera can be above 180 degrees. Until now, there is no camera with view angle of 360 degrees using only one camera module now. In order to take a panoramic picture of 360 degrees, the camera has to be automatically rotated about a vertical axis by a complex actuator mechanism. However, it is difficult to produce the camera with the complex actuator mechanism.

Therefore, a panoramic camera which can overcome the above mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
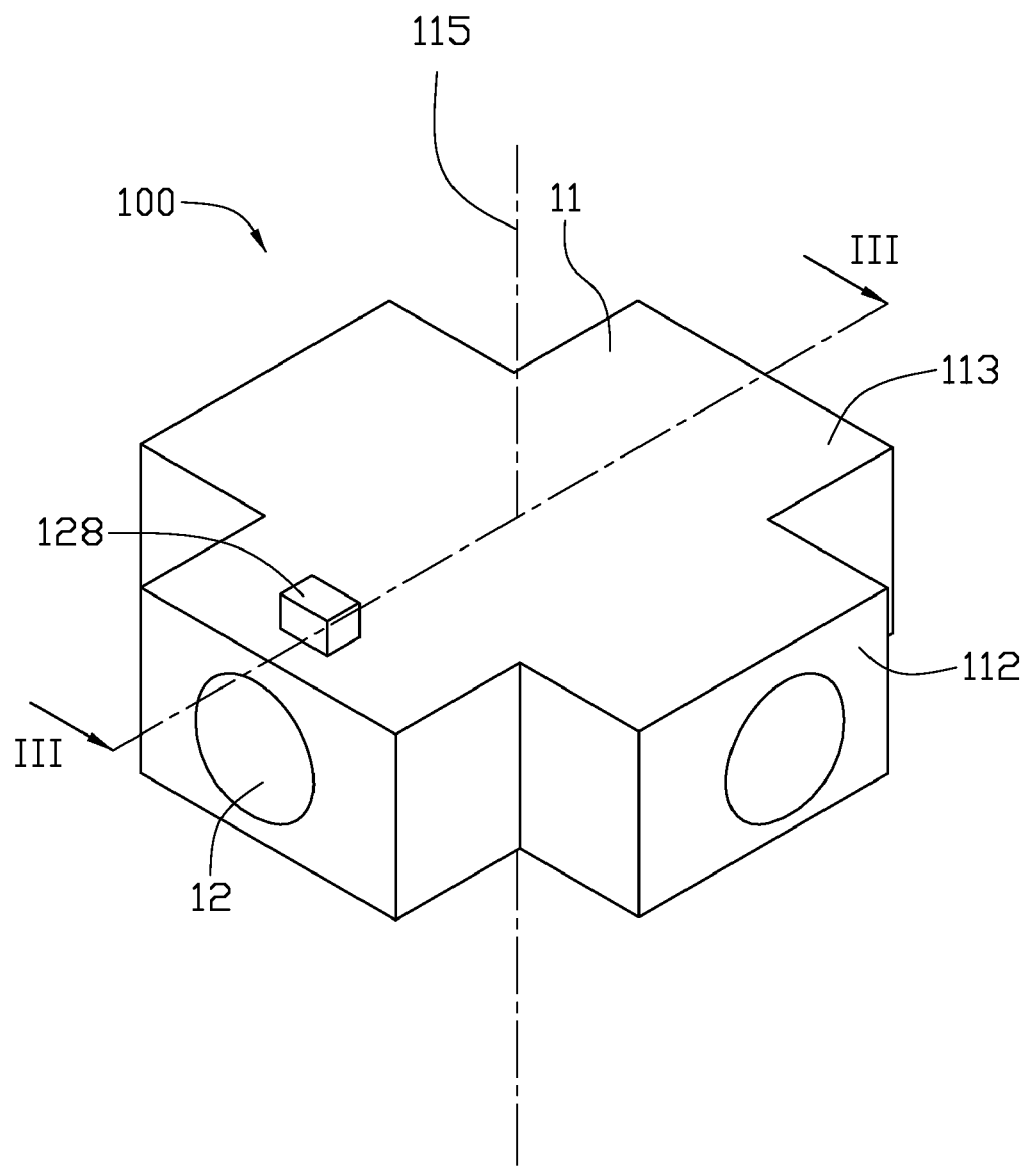
FIG. 1 is a schematic, isometric view of a panoramic camera according to a first embodiment of the present invention.
Figure 2:
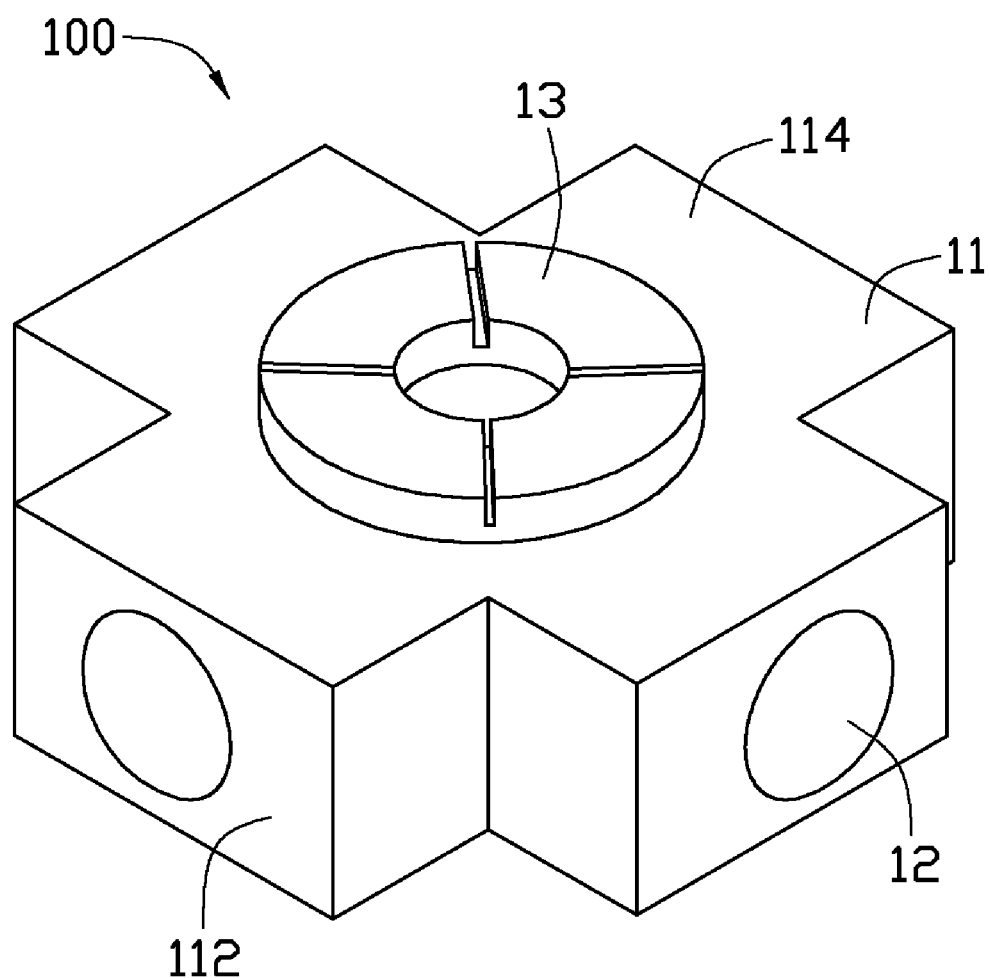
FIG. 2 is similar to FIG. 1, but shows the panoramic camera of FIG. 1 from a different view angle.
Figure 3:
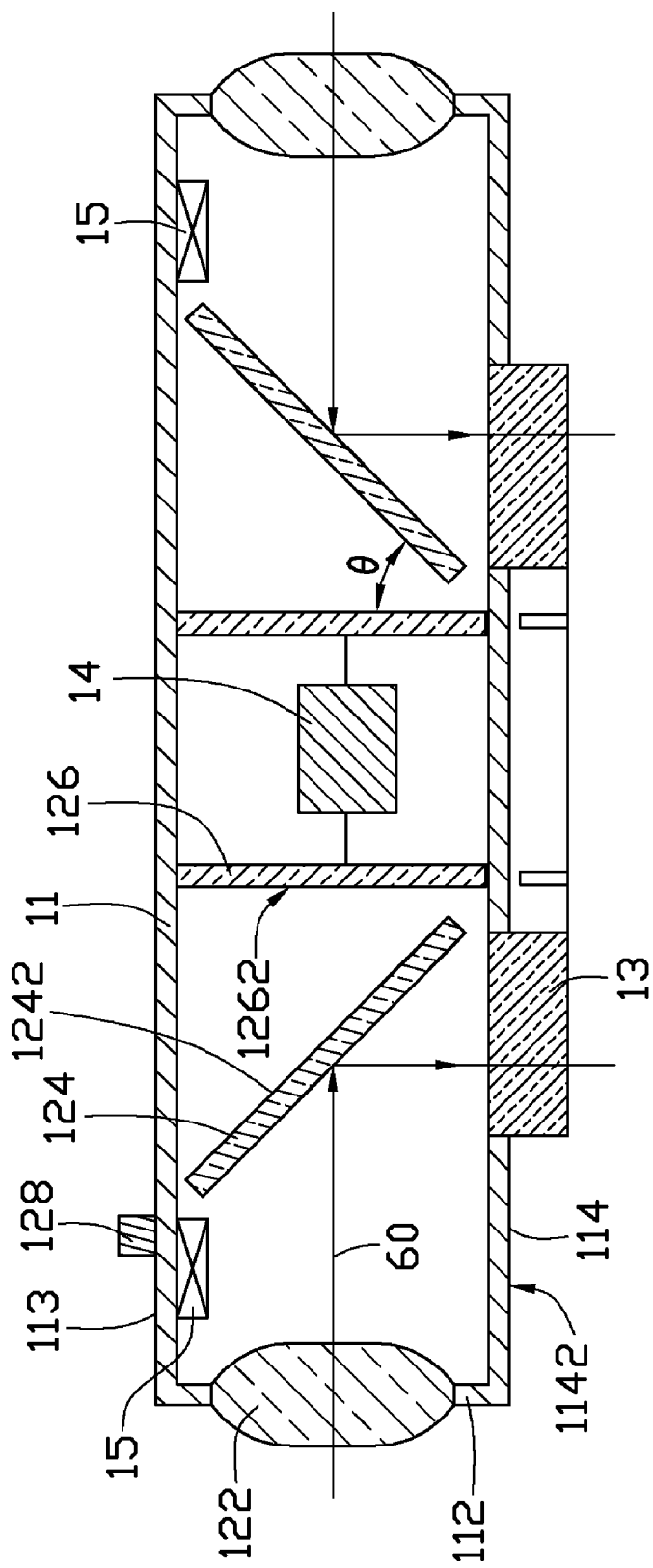
FIG. 3 is a cross-sectional view of the panoramic camera of FIG. 1, taken along line thereof, and shows a reflective mirror of FIG. 1 in a first state in which the angle defined by the plane of the reflective mirror and a light sensing surface of the image sensor is 45 degrees.
Figure 4:
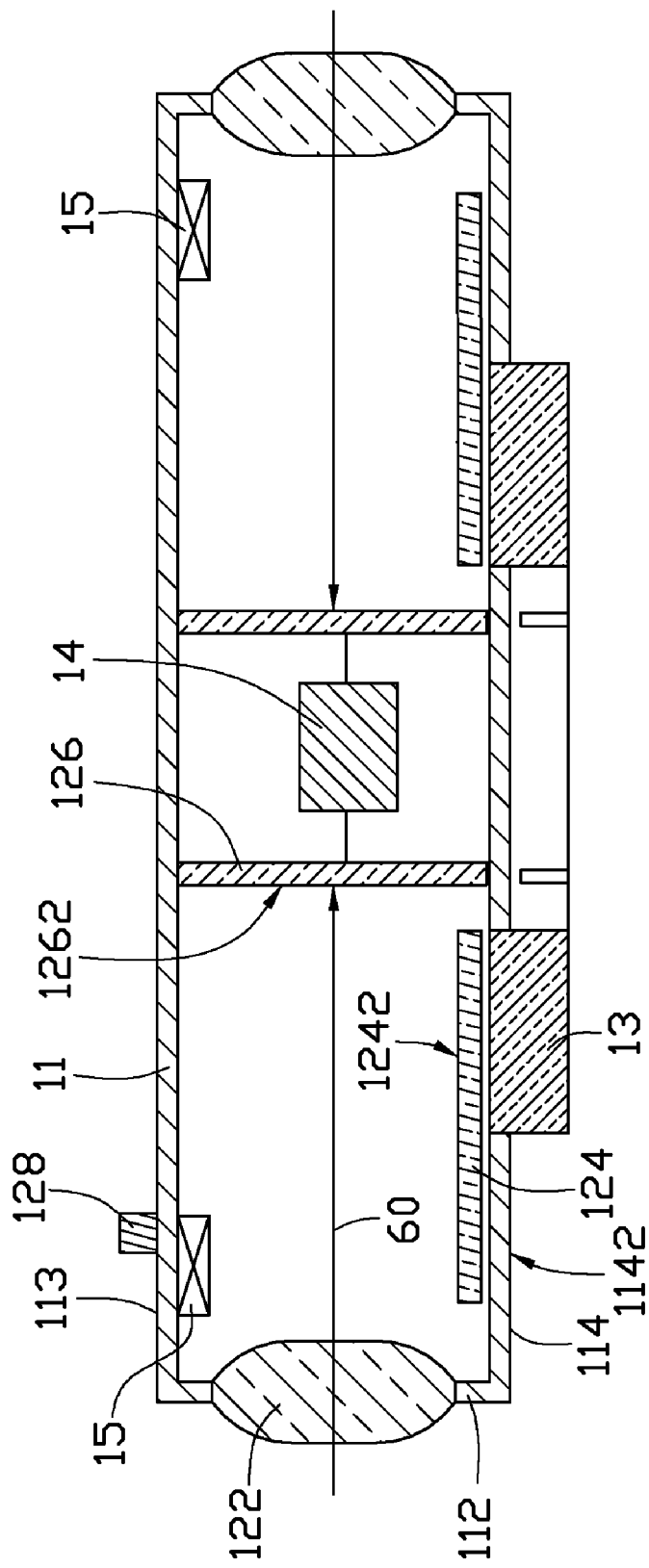
FIG. 4 is similar to FIG. 3, but shows the reflective mirror in a second state in which the angle defined by the plane of the reflective mirror and the light sensing surface of the image sensor is 90 degrees.

Various embodiments will now be described in detail below with reference to the drawings.

Referring to FIGS. 1-4, a panoramic camera 100 according to a first embodiment is shown. The panoramic camera 100 includes a housing 11, four camera modules 12, four viewfinders 13, and an image processor 14.

The housing 11 includes a top plate 113, a bottom plate 114, and a sidewall 112 connecting the top plate 113 with the bottom plate 114. The housing 11 includes an axis 115. In the present embodiment, the top plate 113 is substantially parallel to the bottom plate 114, and the sidewall 112 is substantially perpendicular to the top plate 113 and the bottom plate 114.

Four camera modules 12 are received in the housing 11. Each camera module 12 includes a lens 122, a reflective mirror 124, and an image sensor 126 arranged in an order written from an object side to an image side. A shutter button 128 is disposed on an outer surface of the housing 11. The shutter button 128 is configured for controlling opening or closing of the shutter (not shown). The image sensor 126 has a light sensing surface 1262. An angle θ is defined between a surface 1242 of the reflective mirror 124 and the light sensing surface 1262 of the image sensor 126. The reflective mirror 124 can be driven by an actuator 15 to rotate to adjust the angle θ. It can be understood that in other embodiments, each camera module 12 can include more than one lens, or can include other optical elements, such as spacers. In the present embodiment, the four lenses 122 are disposed along the sidewall 112 of the housing 11, and the four lenses 122 are arranged on an imaginary circle. It can be understood that in alternative embodiments, the four lenses 122 can be arranged on an imaginary ellipse.

The four camera modules 12 are disposed in a back to back fashion such that the lenses 122 each point in a radially outward direction, thereby achieving different view portions of the surrounding scene, respectively. The optical axes of the four camera modules 12 are coplanar and intersect at a common point. In the present embodiment, the lens 122 of the camera modules 12 each has the optical axis perpendicular to and coplanar with the axis. In the present embodiment, the optical axes of the two opposite camera modules 12 are on a line, and the optical axes of the two adjacent camera modules 12 are perpendicular to each other.

Each camera module 12 has a viewing angle. The four camera modules 12 cooperatively form a full 360 degrees view image of the surrounding scene. In the present embodiment, the viewing angle of each camera module 12 is larger than 90 degrees. In alternative embodiments, the sum of the viewing angles of all the camera modules 12 is larger than or equal to 360 degrees.

The four viewfinders 13 are disposed on an outer surface 1142 of the bottom plate 114. The four viewfinders 13 each correspond to the respective camera module 12. The four viewfinders 13 face a common direction parallel to the axis 115.

The image processor 14 electrically connects each camera module 12. The image processor 14 is configured for stitching together the individual images captured by the camera modules 14 into a single panoramic image of the surrounding scene.

In operation, when the shutter button 128 is not pressed down, that is, the shutter (not shown) is closed, the angle θ remains at an acute angle, for example, 45 degrees. At this time, incident light 60 is reflected by the reflective mirror 124 to the viewfinder 13, so that the captured image can be observed from the viewfinder 13. When the shutter button 128 is pressed down, that is, the shutter (not shown) is opened, the angle θ is adjusted by the actuator 15 to 90 degrees. At this time, the surface 1242 of the reflective mirror 124 is substantially perpendicular to the light sensing surface 1262 of the image sensor 126. Thus, the incident light 60 is incident upon the image sensor 126. Then the image processor 14 stitches the individual image captured by the camera modules 14 together into a single panoramic image of the surrounding scene.

It should be noted that, the viewfinders 13 are disposed on the bottom plate 114, therefore photographer should lift the panoramic camera 100 overhead to take a picture.

Figure 5:
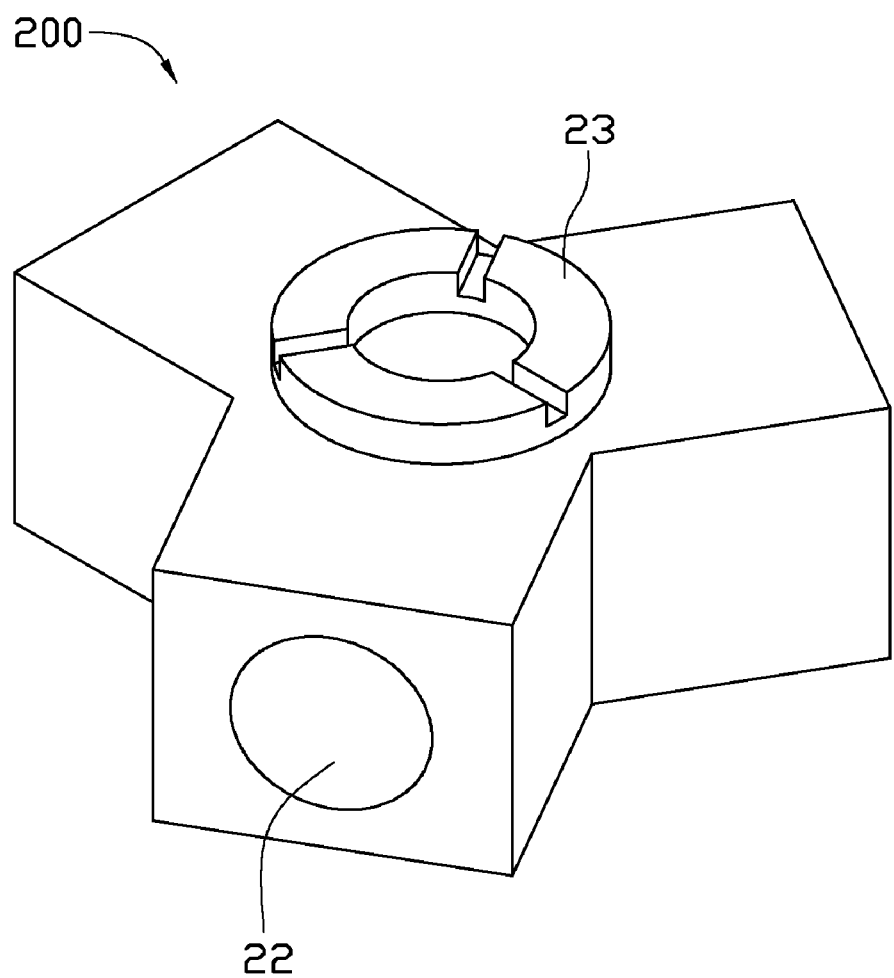
FIG. 5 is a schematic, isometric view of a panoramic camera according to a second embodiment of the present invention.

Referring to FIG. 5, a panoramic camera 200 according to a second embodiment is shown. The panoramic camera 200 is similar to the panoramic camera 100. However, the panoramic camera 200 includes three camera modules 22 and three corresponding viewfinders 23. In the present embodiment, the viewing angle of each camera module 22 is larger than 120 degrees. In the present embodiment, an angle defined by the axes of the adjacent camera module 22 is about 120 degrees.

It can be understood that the number of camera modules used will depend on their field of view characteristics, and it is not limited to the present embodiment.

No complex actuator mechanism is required for rotating the camera module 100 or 200. Thus, the panoramic camera 100 or 200 can be compact, simple, and easy to make.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope and spirit of the appended claims.

The invention claimed is:

1. A panoramic camera comprising:
a housing;
a plurality of camera modules received in the housing, each camera module comprising a lens, a reflective mirror, and an image sensor arranged in an order written from an object side to an image side, the camera modules configured for cooperatively forming a 360 degrees view image of the surrounding scene;
a plurality of viewfinders each corresponding to each camera module; and
an image processor, wherein an angle is defined between the plane of the reflective mirror and a light sensing surface of the image sensor in each camera module, and each reflective mirror is rotatable between a first position where the angle is an acute angle, light is reflected by the reflective mirror to the corresponding viewfinder, and a second position where the angle is about 90 degrees, light is incident upon the light sensing surface of the image sensor, and the image processor stitches together the images captured by the camera modules into a single panoramic image of the surrounding scene.

2. The panoramic camera of claim 1, wherein the housing comprises a top plate, a bottom plate, a sidewall connecting the top plate with the bottom plate, the lenses of the camera modules are disposed along the sidewall of the housing, and the viewfinders are disposed on the bottom plate.

3. The panoramic camera of claim 1, wherein the camera modules are radially arranged and face outward.

4. The panoramic camera of claim 1, wherein the optical axes of the camera modules are coplanar and intersect at a common point.

5. The panoramic camera of claim 4, wherein the number of the camera modules is four.

6. The panoramic camera of claim 5, wherein the optical axes of the two opposite camera modules are on a line, and the optical axes of the two adjacent camera modules are perpendicular to each other.

7. The panoramic camera of claim 5, wherein a viewing angle of each camera module is larger than 90 degrees.

8. The panoramic camera of claim 5, wherein the sum of viewing angles of the four camera modules is larger than or equal to 360 degrees.

9. The panoramic camera of claim 4, wherein the number of the camera modules is three.

10. The panoramic camera of claim 9, wherein a viewing angle of each camera module is larger than 120 degrees.

11. The panoramic camera of claim 9, wherein the sum of viewing angles of the three camera modules is larger than or equal to 360 degrees.

12. The panoramic camera of claim 9, wherein an angle defined by the axes of the adjacent camera module is about 120 degrees.

13. The panoramic camera of claim 1, wherein the acute angle is 45 degrees.

14. The panoramic camera of claim 1, wherein the lenses are arranged on an imaginary circle.

15. The panoramic camera of claim 1, wherein the lenses are arranged on an imaginary ellipse.

16. A panoramic camera comprising:
a housing having an axis;
a plurality of camera modules received in the housing, each camera module comprising a lens, a reflective mirror, and an image sensor, the lenses of the camera modules each having an optical axis perpendicular to and coplanar with the axis, the camera modules configured for cooperatively forming a 360 degrees view image of the surrounding scene;
a plurality of viewfinders associated with the respective camera modules, the viewfinders facing a common direction parallel to the axis; and
an image processor, wherein, an angle is defined between the plane of the reflective mirror and a light sensing surface of the image sensor in each camera module, and each reflective mirror is rotatable between a first position where the angle is an acute angle, light is reflected by the reflective mirror to the corresponding viewfinder, and a second position where the angle is about 90 degrees, light is incident upon the light sensing surface of the image sensor without being reflected by the reflective mirror, and the image processor stitches together the individual images captured by the camera modules into a single panoramic image of the surrounding scene.

* * * * *